(12) United States Patent
Akahori

(10) Patent No.: US 9,969,272 B2
(45) Date of Patent: May 15, 2018

(54) ELECTRIC POWER SUPPLY SYSTEM

(71) Applicant: LAPIS Semiconductor Co., Ltd., Yokohama (JP)

(72) Inventor: Hiroji Akahori, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 459 days.

(21) Appl. No.: 14/828,167

(22) Filed: Aug. 17, 2015

(65) Prior Publication Data

US 2016/0048195 A1 Feb. 18, 2016

(30) Foreign Application Priority Data

Aug. 18, 2014 (JP) ................................. 2014-166156

(51) Int. Cl.
*B60L 11/00* (2006.01)
(52) U.S. Cl.
CPC ...................... *B60L 11/00* (2013.01)
(58) Field of Classification Search
CPC ....... B60L 11/00; G60F 1/3287; G60F 1/3293
See application file for complete search history.

(56) References Cited

U.S. PATENT DOCUMENTS

| 2008/0229121 | A1* | 9/2008 | Lassa | G06F 1/3203 |
| | | | | 713/300 |
| 2013/0271080 | A1* | 10/2013 | Yoshida | H02J 1/10 |
| | | | | 320/109 |
| 2014/0191705 | A1* | 7/2014 | Takao | H02J 7/0054 |
| | | | | 320/103 |

FOREIGN PATENT DOCUMENTS

JP 2011-230714 A 11/2011

* cited by examiner

*Primary Examiner* — Jeffrey Shin
(74) *Attorney, Agent, or Firm* — Rabin & Berdo, P.C.

(57) ABSTRACT

A master device supplies a power supply voltage through a power transmission line to a slave device that generates an operation signal indicating the contents of an operation received by an operation unit. The slave device includes an operation execution switch that is turned on to apply a reference voltage to the power transmission line, upon reception of the operation by the operation unit. The master device determines whether or not a current accompanying a pilot signal is flowing through the power transmission line, while intermittently sending the pilot signal to the power transmission line in the state of stopping the supplying of the power supply voltage to the slave device. If it is determined that the current is flowing, the master device supplies the power supply voltage to the slave device.

16 Claims, 12 Drawing Sheets

ELECTRIC POWER SUPPLY SYSTEM

BACKGROUND OF THE INVENTION

1. Field of the Invention

The present invention relates to an electric power supply system for supplying electric power to an electrical component, more specifically, to an electrical component driven by a battery.

2. Related Art

Currently, as products to which such an electric power supply system is applied, for example, electrically assisted pedal cycles having an electric motor to assist the rider's pedal-power are known. In addition to the motor and a headlight, the electrically assisted pedal cycles are provided with various electrical components such as a torque sensor for the motor, a rotation sensor, an operation unit for operating the sensors, and an assist control unit (for example, see Japanese Patent Application Laid-Open Kokai No. 2011-230714). Also, bicycles having an electric transmission to enable electric gear shifting of the bicycle have made their appearance in recent years. Thus, in such products having the electrical components, a power supply voltage generated by a battery is supplied to the respective electrical components through power lines.

The larger the number of the electrical components supplied with power by the battery, the more quickly the battery is consumed and the more frequently the battery needs charging, thus desiring low power consumption. On the contrary, some of the electrical components installed in, for example, the bicycles are in a standby state for a long period of time. An ineffective power consumed during the standby state of the electrical components especially interferes with the reduction of the power consumption.

SUMMARY OF THE INVENTION

An object of the present invention is to provide an electric power supply system having reduced power consumption.

An electric power supply system according to the present invention includes a battery for generating a power supply voltage, an operation unit for receiving an operation by a user, a slave device for generating an operation signal that indicates contents of the operation received by the operation unit, and a master device connected to the battery. The master device controls the supplying of the power supply voltage to the slave device through a power transmission line. The slave device has an operation execution switch that is turned on when the operation unit receives the operation, to apply a reference potential to the power transmission line. The master device determines whether or not a current is flowing through the power transmission line, while intermittently sending a pilot signal to the power transmission line in the state of stopping the supplying of the power supply voltage to the slave device. If it is determined that the current is flowing, the master device starts supplying the power supply voltage to the slave device.

Another electric power supply system according to the present invention includes a battery for generating a power supply voltage, an operation unit for receiving an operation by a user, a first slave device for generating an operation signal that indicates contents of the operation received by the operation unit, a second slave device for generating a detection signal that indicates detection contents detected by a sensor, and a master device connected to the battery. The master device supplies the power supply voltage to the first and second slave devices through a power transmission line. The first slave device has an operation execution switch that is turned on when the operation unit receives the operation, to apply a reference potential to the power transmission line. The master device determines whether or not a current is flowing through the power transmission line, while intermittently sending a pilot signal to the power transmission line in the state of stopping the supplying of the power supply voltage to the first and second slave devices. If it is determined that the current is flowing, the master device starts supplying the power supply voltage to the first and second slave devices.

According to the present invention, the master device supplies the power supply voltage to the slave device that generates the operation signal indicating the contents of the operation received by the operation unit, only if the operation unit receives the operation. Therefore, no power supply voltage is supplied to the slave device during a standby condition in which no operation is performed, thus allowing reduction of power consumption.

DETAILED DESCRIPTION OF EMBODIMENTS

An embodiment of the present invention will be hereinafter described in detail with reference to the drawings.

Figure 1:
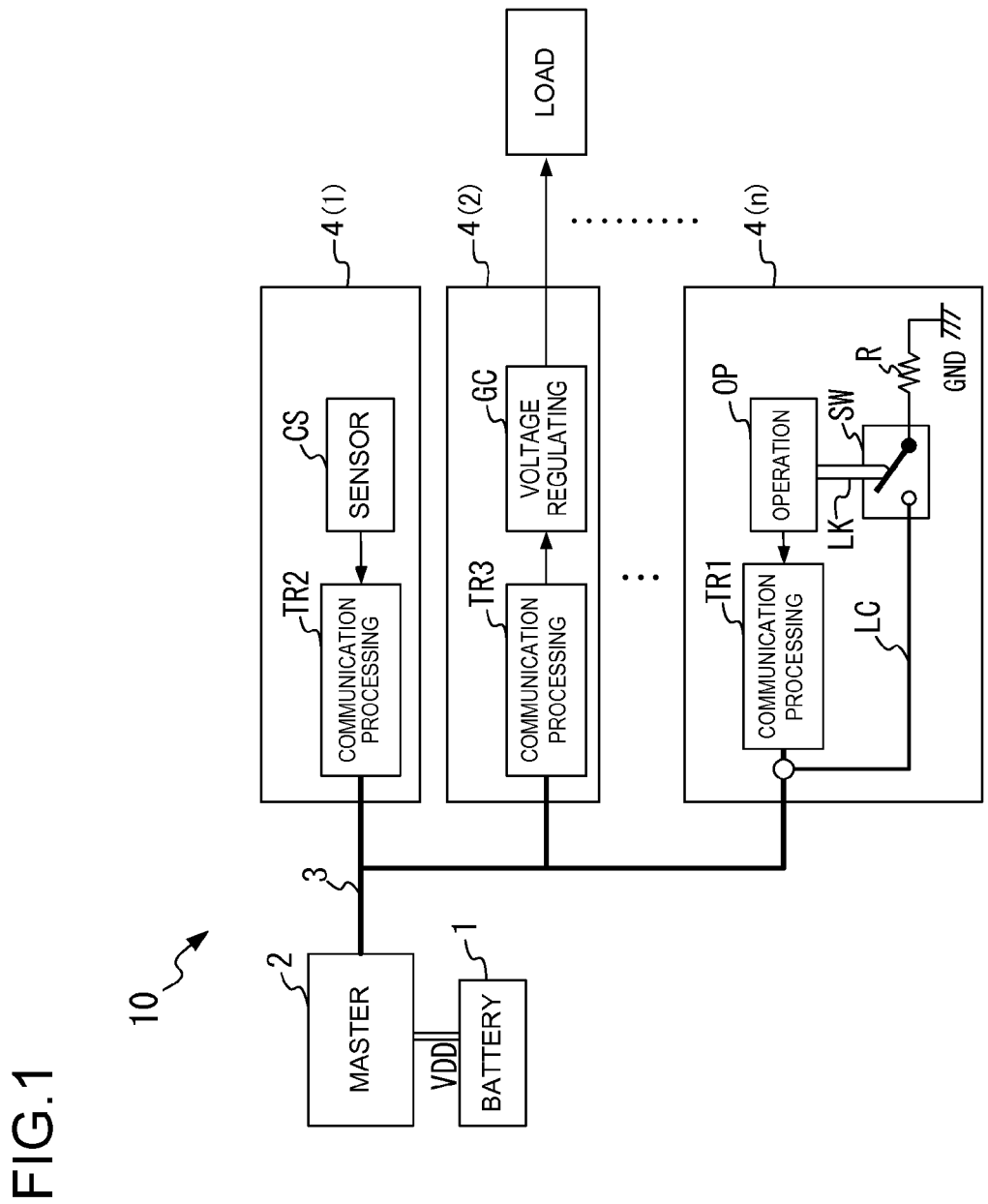
FIG. 1 is a block diagram showing the configuration of an electric power supply system 10 according to the present invention.

FIG. 1 is the block diagram showing the schematic configuration of an electric power supply system 10 according to the present invention. The electric power supply system 10 has a battery 1, a master device 2, a power transmission line 3, and slave devices 4(1) to 4(n) (n is an integer of 2 or more) each of which is an independent electrical component and supplied with power from the master device 2.

The battery 1 generates a direct current power supply voltage VDD, and supplies the power supply voltage VDD to the master device 2.

The master device 2 is driven by the power supply voltage VDD supplied from the battery 1. The master device 2 supplies the power supply voltage VDD to the slave devices 4(1) to 4(n) through the power transmission line 3 only during a power supply effective time. The master device 2 also receives a control signal or a detection signal transmitted from each of the individual slave devices 4(1) to 4(n) through the power transmission line 3, and performs control based on the operation signal or the detection signal.

At least one of the slave devices 4(1) to 4(n), for example, the slave device 4(n) has an operation unit OP for receiving an operation from a user, a communication processing unit TR1, a line LC, an operation execution switch SW, a resistor R, and an operation link mechanism LK. The communication processing unit TR1 is operated in accordance with the power supply voltage VDD supplied through the power transmission line 3, and sends the operation signal that indicates the contents of the operation received by the operation unit OP to the master device 2 through the power transmission line 3.

The line LC is electrically connected to the power transmission line 3 and one end of the operation execution switch SW. A ground potential GND is applied to the other end of the operation execution switch SW through the resistor R. The operation link mechanism LK transmits a force of the user when operating the operation unit OP. The operation execution switch SW is, for example, a mechanical microswitch that is turned on only while the force is applied through the operation link mechanism LK. The operation execution switch SW is turned on only while the user is operating the operation unit OP, and thus the ground potential GND is applied as a reference potential to the power transmission line 3 through the line LC.

Another slave device of the slave devices 4(1) to 4(n), for example, the slave device 4(1) has a sensor CS and a communication processing unit TR2. The communication processing unit TR2 is operated in accordance with the power supply voltage VDD supplied through the power transmission line 3, and transmits the detection signal detected by the sensor CS to the master device 2 through the power transmission line 3.

Another slave device of the slave devices 4(1) to 4(n), for example, the slave device 4(2) has a communication processing unit TR3 and a voltage regulating unit GC. The communication processing unit TR3 supplies the voltage regulating unit GC with the power supply voltage VDD and load drive data supplied from the master device 2 through the power transmission line 3. The voltage regulating unit GC is composed of, for example, a DA converter and the like, and supplies a load such as a motor with a load drive voltage indicated by the load drive data on the basis of the power supply voltage VDD. The motor may be installed in, for example, a front derailleur 403 or a rear derailleur 404 as described later. The slave device 4(2) may be composed of only the communication processing unit TR3. That is, in this case, the communication processing unit TR3 generates the above-described load drive voltage, and supplies the load with the load drive voltage.

The power supply operation by the power supply system shown in FIG. 1 will be described below. The master device 2 supplies the slave devices 4(1) to 4(n) with the power supply voltage VDD in accordance with the power supply control flow shown in FIG. 2.

Figure 2:
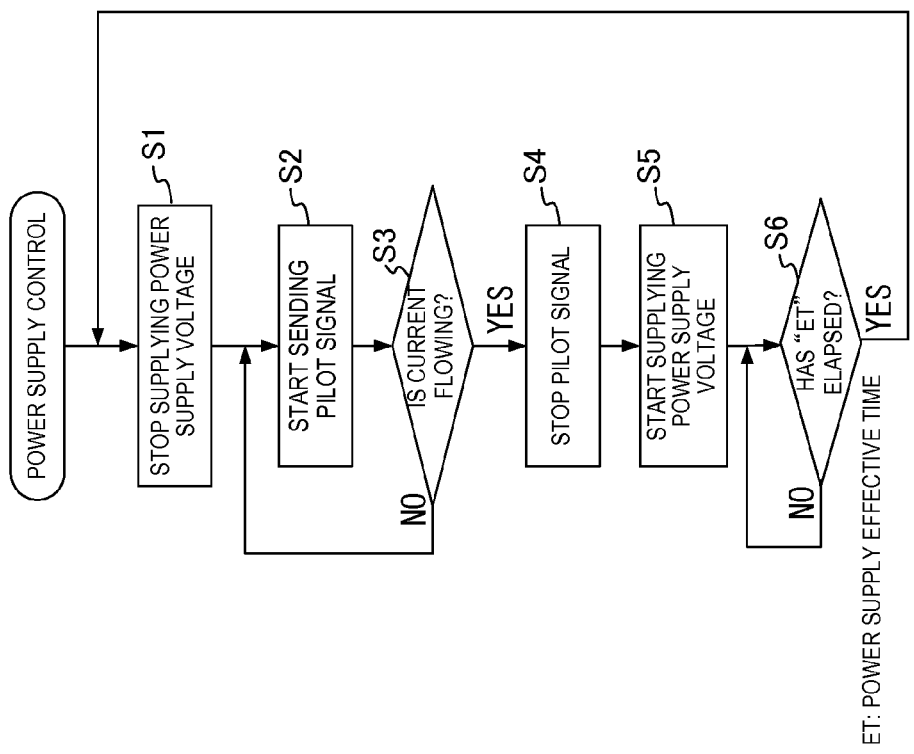
FIG. 2 is a flowchart of a power supply control flow in the electric power supply system 10.

In FIG. 2, the master device 2 first stops supplying the power supply voltage VDD to the power transmission line 3 (step S1).

Then, the master device 2 intermittently sends a pilot signal PLS being a frequency signal to the power transmission line 3 (step S2).

Then, the master device 2 determines whether or not a current that accompanies the sending of the pilot signal PLS is flowing through the power transmission line 3 (step S3). During this time, if the slave device having the operation unit OP among the slave devices 4(1) to 4(n), for example, the slave device 4(n) does not receive the operation from the user at its operation unit OP, the operation execution switch SW is in an off state. Thus, the current that accompanies the sending of the pilot signal PLS does not flow into the power transmission line 3. If the operation unit OP receives the operation from the user, the operation execution switch SW is in an on state. Thus, the current that accompanies the sending of the pilot signal PLS sent from the master device 2 flows into the resistor R through the power transmission line 3, the line LC, and the operation execution switch SW.

If it is determined in the step S3 that the current accompanying the pilot signal PLS is not flowing through the power transmission line 3, the operation goes back to the above step S2 and the master device 2 repeats the operation described above. On the other hand, if it is determined in the step S3 that the current accompanying the pilot signal PLS is flowing through the power transmission line 3, the master device 2 stops the sending of the pilot signal PLS (step S4).

Then, the master device 2 supplies the power supply voltage VDD generated by the battery 1 to the power transmission line 3 (step S5).

Then, the master device 2 determines whether or not a predetermined power supply effective time ET has elapsed since the supplying of the power supply voltage VDD is started in the step S5 (step S6). If it is determined in the step S6 that the power supply effective time ET has not elapsed yet, then the master device 2 repeats the determination of the step S6.

According to the sequential operation described above, the power supply voltage VDD is supplied to the slave devices 4(1) to 4(n) only during the power supply effective time ET. By the supplying of the power supply voltage VDD, the slave devices 4(1) to 4(n) are actuated. The slave devices 4(1) to 4(n) transmit information (operation signal or detection signal) that is obtained by the operation unit OP or the sensor CS provided respectively therein to the master device 2 through the power transmission line 3.

If it is determined in the step S6 that the power supply effective time ET has elapsed, the operation goes back to the step S1 to make the master device 2 stop supplying the power supply voltage VDD to the power transmission line 3, and then repeats the steps S2 to S6.

According to the power supply control shown in FIG. 2, the supplying of the power supply voltage VDD to the slave devices 4(1) to 4(n) is started in response to the operation on the operation unit OP by the user, and continued only during the power supply effective time ET. Therefore, in a state where the operation unit OP does not receive the operation from the user, that is, in a standby state, the power supply to the slave devices 4(1) to 4(n) is stopped, resulting in reduced power consumption.

Figure 3:
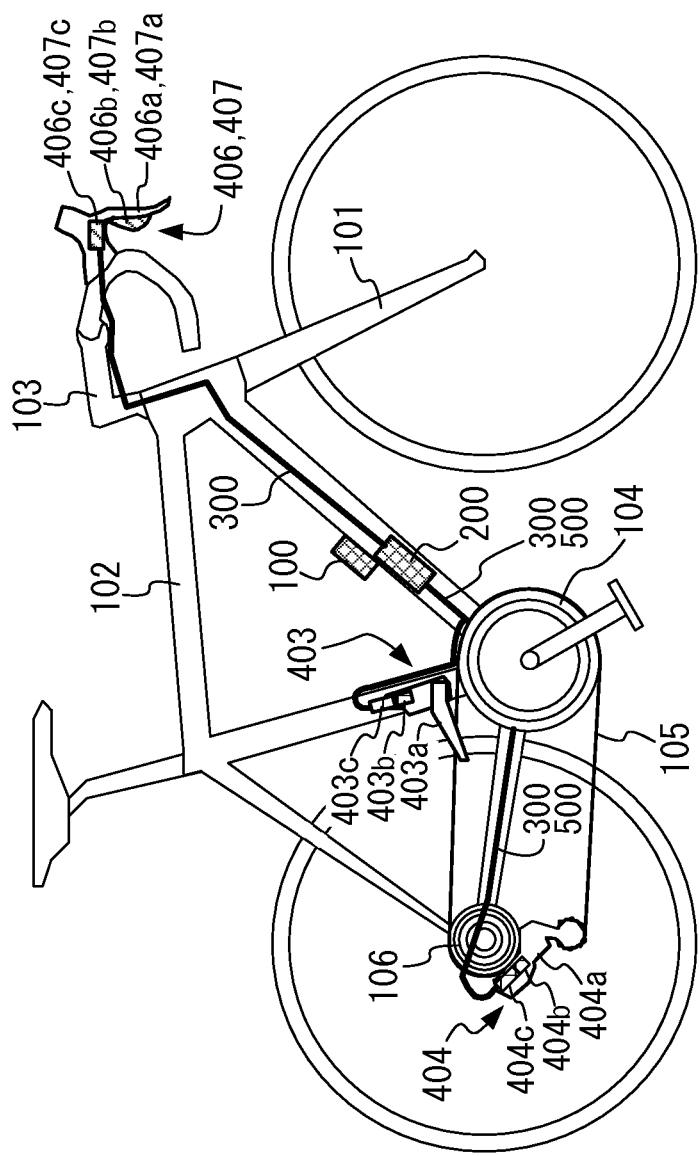
FIG. 3 is a drawing showing the structure of a bicycle in its entirety to which the electric power supply system 10 according to the present invention is applied to an electric transmission for the bicycle.

FIG. 3 is the drawing showing the structure of a bicycle in its entirety to which the electric power supply system 10 shown in FIG. 1 is applied to an electric transmission for the bicycle.

In FIG. 3, a frame 102 having a front fork 101, which supports a front wheel of the bicycle in a rotatable manner, is provided with a front derailleur 403 and a rear derailleur 404. A handle 103 is fixed onto the front fork 101.

The front derailleur 403 includes a mechanical part 403a for shifting a chain 105 gearing with a crank sprocket 104, a motor 403b for driving the mechanical part 403a, and a transmission state detection unit 403c for detecting a transmission state.

The rear derailleur 404 includes a mechanical part 404a for shifting the chain 105 gearing with a rear wheel sprocket 106, a motor 404b for driving the mechanical part 404a, and a transmission state detection unit 404c for detecting a transmission state.

The handle 103 is provided with a left hand brake operation unit 406 and a right hand brake operation unit 407.

The left hand brake operation unit 406 includes a brake lever 406a, a transmission operation unit 406b, and an operation information detection unit 406c.

The right hand brake operation unit 407 includes a brake lever 407a, a transmission operation unit 407b, and an operation information detection unit 407c.

Furthermore, a battery 100 corresponding to the battery 1 shown in FIG. 1, a control unit 200 having the function of the master device 2, a power transmission line 300 corresponding to the power transmission line 3, and wiring 500 for motor control drive are attached to the frame 102.

The battery 100 is connected to the control unit 200, and supplies a direct current power supply voltage VDD to the control unit 200.

The control unit 200 is driven by the power supply voltage VDD supplied from the battery 100. The control unit 200 performs power supply control over the transmission state detection units 403c and 404c and the operation information detection units 406c and 407c, which correspond to the slave devices 4 shown in FIG. 1. Furthermore, the control unit 200 performs electric transmission control over the front derailleur 403 and the rear derailleur 404.

Figure 4:
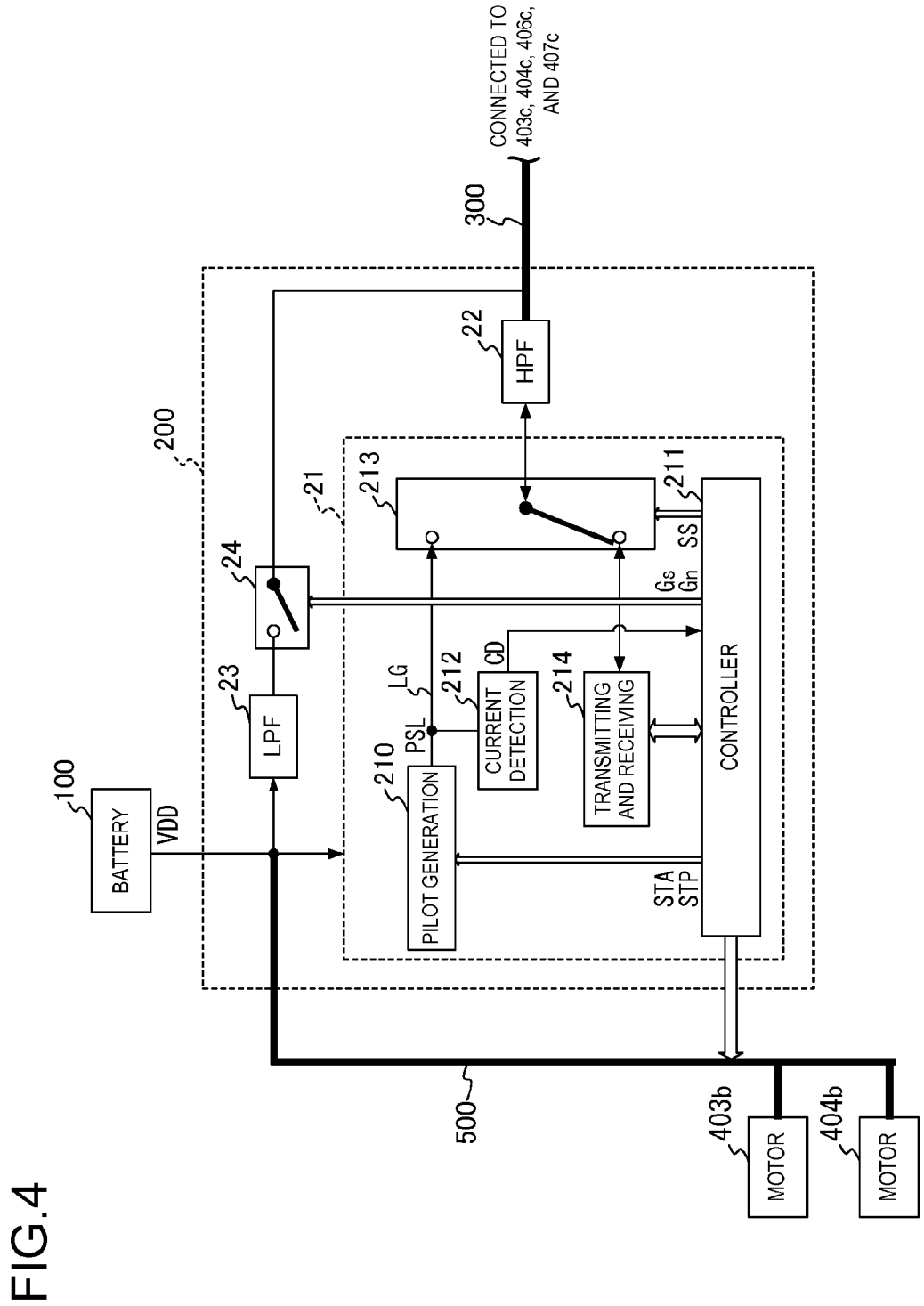
FIG. 4 is a block diagram showing the configuration of a control unit 200.
Figure 5:
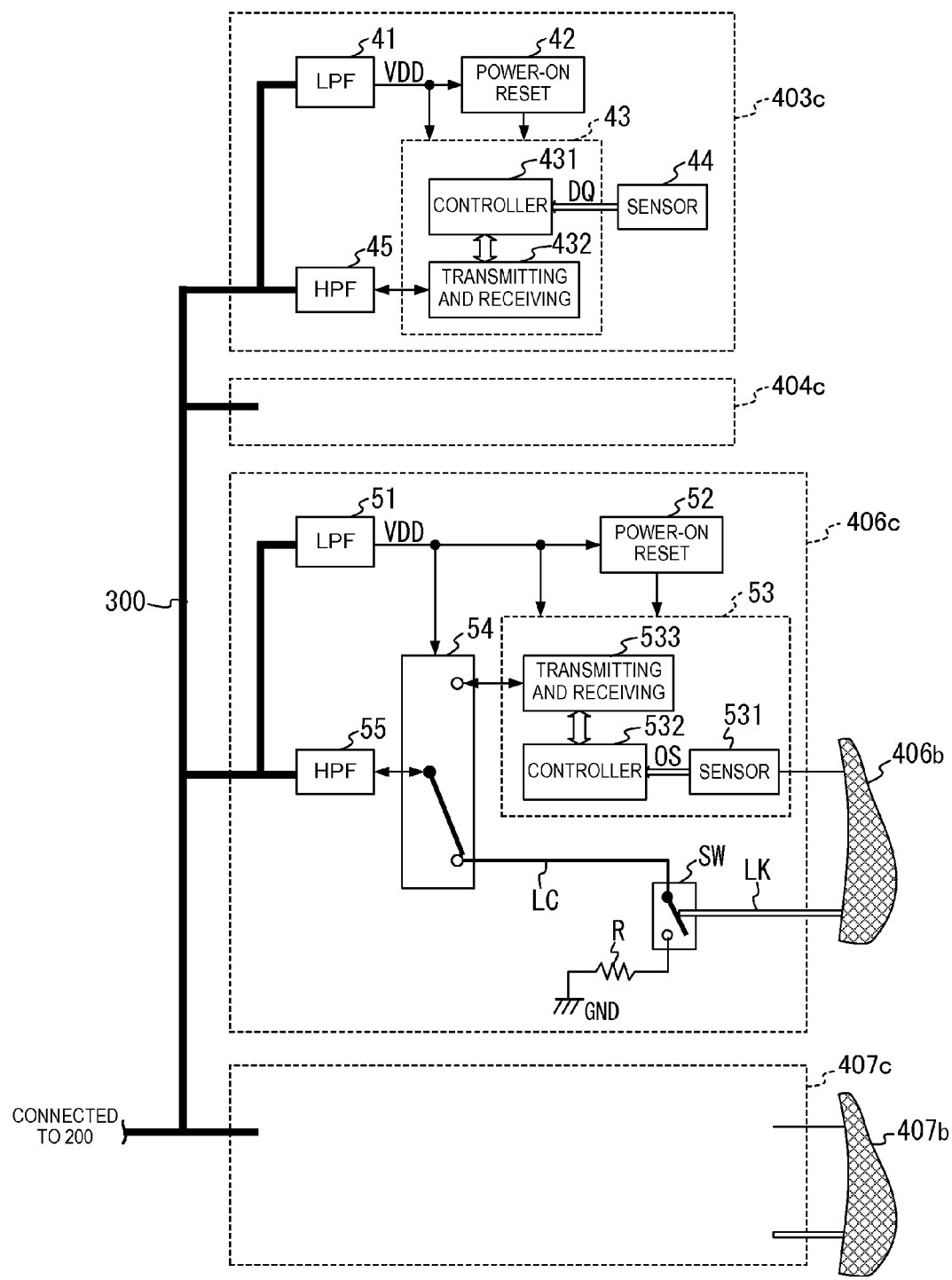
FIG. 5 is a block diagram showing the configurations of transmission state detection units 403c and 404c and operation information detection units 406c and 407c.

FIG. 4 is the block diagram showing the internal configuration of the control unit 200, and FIG. 5 is the block diagram showing the internal configuration of each of the transmission state detection units 403c and 404c and the operation information detection units 406c and 407c.

As shown in FIG. 4, the control unit 200 includes a communication processing unit 21, a high-pass filter 22, a low-pass filter 23, and a power switch 24.

The communication processing unit 21 includes a pilot generation unit 210, a controller 211, a current detection unit 212, a connection switch 213, and a transmitting and receiving unit 214.

Figure 6:
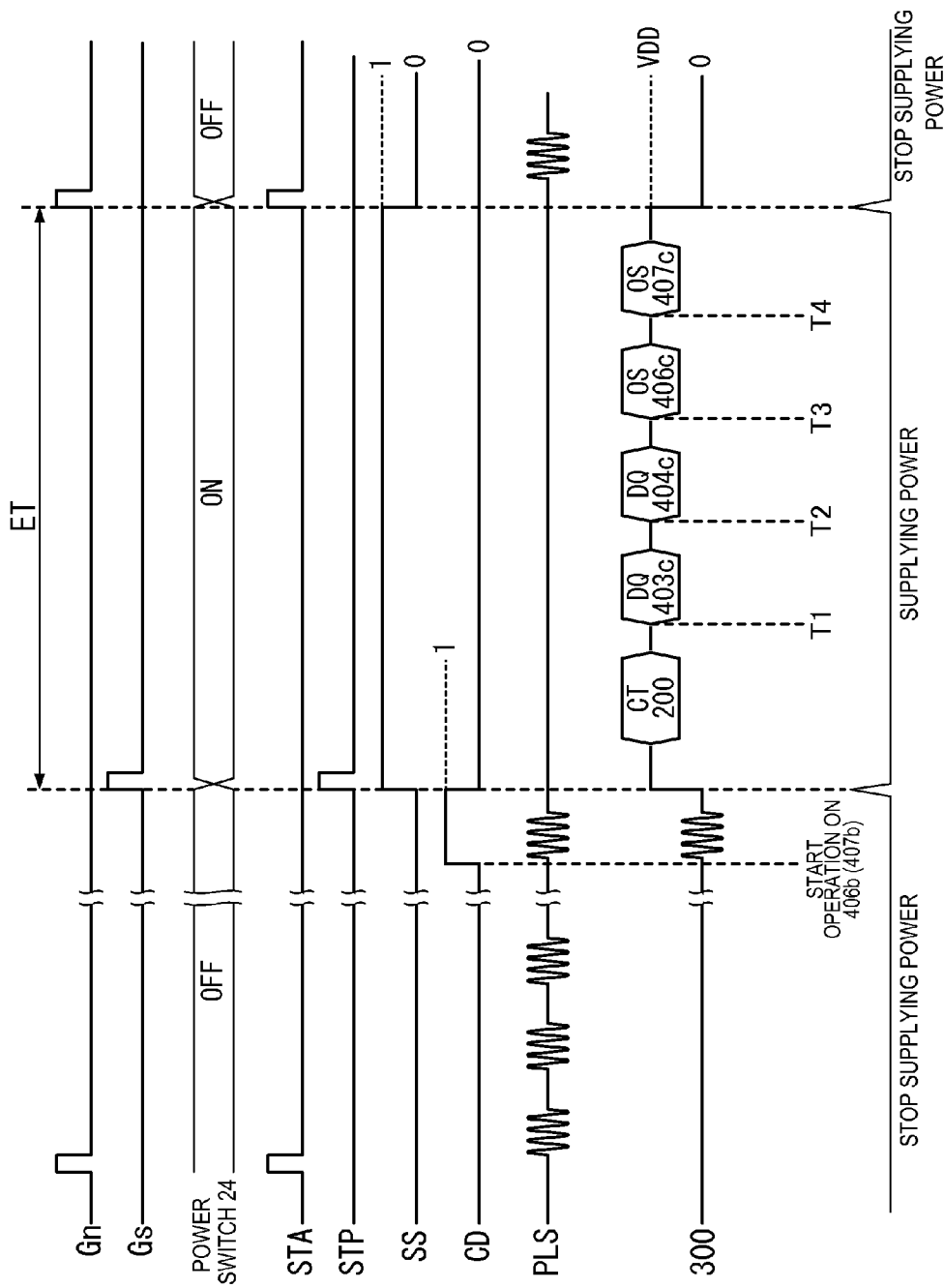
FIG. 6 is a time chart showing an example of a power supply operation in the electric transmission shown in FIG. 3.

The pilot generation unit 210 generates the pilot signal PLS the level of which intermittently varies within a predetermined frequency, in response to a start pulse STA supplied by the controller 211, as shown in FIG. 6. The pilot generation unit 210 sends the pilot signal PLS into a current detection line LG. Note that, as shown in FIG. 6, the pilot generation unit 210 stops generating the pilot signal PLS in response to the stop pulse STP supplied by the controller 211.

The current detection unit 212 detects whether or not a current that accompanies the pilot signal PLS is flowing through the current detection line LG, and sends a current detection signal CD indicating the detection result to the controller 211.

The connection switch 213 selects one of the above-described current detection line LG and the transmitting and receiving unit 214 on the basis of a connection selection signal SS supplied from the controller 211, and electrically connects the selected one to the high-pass filter 22. For example, when the connection selection signal SS having a logic level of 0 is supplied, as shown in FIG. 6, the connection switch 213 electrically connects the current detection line LG to the high-pass filter 22. Thus, the pilot signal PLS generated by the pilot generation unit 210 can be transmitted to the operation information detection units 406c and 407c through the high-pass filter 22 and the power transmission line 300. On the other hand, as shown in FIG. 6, when the connection selection signal SS having a logic level of 1 is supplied, the connection switch 213 electrically connects the transmitting and receiving unit 214 to the high-pass filter 22. Thus, the communication becomes possible between the transmitting and receiving unit 214 and each of the transmission state detection units 403c and 404c and the operation information detection units 406c and 407c through the power transmission line 300.

The transmitting and receiving unit 214 supplies the controller 211 with an operation signal OS and a detection signal DQ (described later) received through the power transmission line 300 and the high-pass filter 22. The transmitting and receiving unit 214 supplies the connection switch 213 with a setting signal CT (described later) supplied from the controller 211.

The controller 211 supplies the pilot generation unit 210 with the above-described start pulse STA and stop pulse STP. The controller 211 supplies the connection switch 213 with the connection selection signal SS, and supplies the power switch 24 with a power supply start signal Gs or a power supply stop signal Gn. The controller 211 generates the setting signal CT, which indicates transmission timing of transmitting the operation signal OS or the detection signal DQ in relation to each of the transmission state detection units 403c and 404c and the operation information detection units 406c and 407c, and supplies the transmitting and receiving unit 214 with the setting signal CT. The timing of transmitting the operation signal OS or the detection signal DQ indicated by the setting signal CT is different among the transmission state detection units 403c and 404c and the operation information detection units 406c and 407c.

If the operation signal OS and the detection signal DQ are supplied from the transmitting and receiving unit 214, the controller 211 generates a derailleur drive signal for driving the mechanical part 403a of the front derailleur 403 or the mechanical part 404a of the rear derailleur 404, on the basis of the operation signal OS and the detection signal DQ. The controller 211 supplies the derailleur drive signal for driving the front derailleur 403 to the motor 403b of the front derailleur 403 through the wiring 500. Furthermore, the controller 211 supplies the derailleur drive signal for driving the rear derailleur 404 to the motor 404b of the rear derailleur 404 through the wiring 500. For example, in response to the operation signal OS for commanding a shift-down of the rear derailleur 404, the controller 211 supplies the motor 404b with the derailleur drive signal for shifting the chain 105 in a shift-down direction. In response to the derailleur drive signal, the motor 404b drives the mechanical part 404a to shift the chain 105 in the shift-down direction. It is noted that the motors 403b and 404b are always supplied with the power supply voltage VDD through the wiring 500.

The low-pass filter 23 supplies the power switch 24 with the power supply voltage VDD supplied from the battery 100, while preventing the detection signal DQ or the operation signal OS received through the power transmission line 300 from flowing into the battery 100 and the wiring 500.

If the power supply start signal Gs is supplied from the controller 211, the power switch 24 is kept in the on state to keep the power transmission line 300 applied with the above-described power supply voltage VDD. More specifically, at this time, the transmission state detection units 403c and 404c and the operation information detection units 406c and 407c are each supplied with the power supply voltage VDD through the power transmission line 300. On the other hand, if the power supply stop signal Gn is supplied from the controller 211, the power switch 24 is turned off to stop supplying the power supply voltage VDD to the power transmission line 300. To be more specific, at this time, the supplying of the power supply voltage VDD to each of the transmission state detection units 403c and 404c and the operation information detection units 406c and 407c is stopped.

The high-pass filter 22 prevents the power supply voltage VDD, which is a direct current component superimposed on the power transmission line 300, from being supplied to the connection switch 213 of the communication processing unit 21, while passing the detection signal DQ, the operation signal OS, the pilot signal PLS, or the setting signal CT.

According to the configuration described above, the control unit 200, as the master device, first intermittently sends the pilot signal PLS to the power transmission line 300 in such a state that the supplying of the power supply voltage VDD to each slave device (403c, 404c, 406c, 407c) is stopped. Then, under the supplying stop state of the power supply voltage VDD, the control unit 200 determines whether or not the current is flowing through the power transmission line 300 on the basis of the current detection signal CD from the current detection unit 212. If the current is determined to be flowing, the control unit 200 starts supplying the power supply voltage VDD to the slave devices (403c, 404c, 406c, and 407c). Then, the control unit 200 sends to each slave device at the transmission timing in which each slave device transmits the operation signal OS or the detection signal DQ, in other words, the setting signal CT that indicates the transmission timing different from one slave device to another.

As shown in FIG. 5, the transmission state detection unit 403c, as the slave device, includes a low-pass filter 41, a power-on reset circuit 42, a communication control circuit 43, a sensor 44, and a high-pass filter 45. The sensor 44 corresponds to the sensor CS shown in FIG. 1. The low-pass filter 41, the power-on reset circuit 42, the communication control circuit 43, and the high-pass filter 45 correspond to the communication processing unit TR2 shown in FIG. 1.

The low-pass filter 41 extracts the power supply voltage VDD being a direct current component from the power transmission line 300, and supplies the power supply voltage VDD to the power-on reset circuit 42 and the communication control circuit 43. In response to the supplying of the power supply voltage VDD, the power-on reset circuit 42 generates a single reset pulse only at the time of starting the supplying, and sends the reset pulse to the communication control circuit 43.

The communication control circuit 43 includes a controller 431 and a transmitting and receiving unit 432, which are driven by the supplying of the power supply voltage VDD. The controller 431 and the transmitting and receiving unit 432 are initialized in response to the reset pulse that is supplied immediately after the supplying of the power supply voltage VDD, and then perform the following operation.

That is, the controller 431 supplies the detection signal DQ supplied from the sensor 44 to the transmitting and receiving unit 432.

The transmitting and receiving unit 432 receives the setting signal CT sent from the control unit 200 through the high-pass filter 45. Then, the transmitting and receiving unit 432 supplies the high-pass filter 45 with the above-described detection signal DQ at the transmission timing that is indicated by the setting signal CT and corresponds to the transmission state detection unit 403c, for example, at a time T1 shown in FIG. 6.

The sensor 44 detects the transmission state of the crank sprocket 104, for example, the position of the chain 105 relative to the crank sprocket 104, and supplies the controller 431 with a signal indicating the position thereof as the above-described detection signal DQ.

The high-pass filter 45 provided between the power transmission line 300 and the transmitting and receiving unit 432 prevents the power supply voltage VDD, which is a direct current component superimposed on the power transmission line 300, from being supplied to the transmitting and receiving unit 432 of the communication control circuit 43, while passing the detection signal DQ or the setting signal CT.

According to the configuration described above, the transmission state detection unit 403c as the slave device is actuated by the power supply voltage VDD supplied through the power transmission line 300. During the supplying of the power supply voltage VDD, the transmission state detection unit 403c sends the detection signal DQ that indicates the transmission state of the crank sprocket 104 to the control unit 200 through the power transmission line 300 at the time T1 shown in FIG. 6.

The transmission state detection unit 404c, as the slave device, has a configuration similar to the transmission state detection unit 403c, that is, includes the low-pass filter 41, the power-on reset circuit 42, the communication control circuit 43, the sensor 44, and the high-pass filter 45. However, the sensor 44 of the transmission state detection unit 404c detects the transmission state of the rear wheel sprocket 106, for example, the position of the chain 105 relative to the rear wheel sprocket 106, and supplies the controller 431 with the detection signal DQ indicating the position thereof. The transmitting and receiving unit 432 of the transmission state detection unit 404c receives the setting signal CT sent from the control unit 200 through the high-pass filter 45. The transmitting and receiving unit 432 supplies the above-described detection signal DQ to the high-pass filter 45 at the transmission timing corresponding to the transmission state detection unit 404c indicated by the setting signal CT, for example, at a time T2 shown in FIG. 6.

According to the configuration described above, the transmission state detection unit 404c as the slave device is actuated by the power supply voltage VDD. During the supplying of the power supply voltage VDD, the transmission state detection unit 404c sends the detection signal DQ that indicates the transmission state of the rear wheel sprocket 106 to the control unit 200 through the power transmission line 300 at the time T2 shown in FIG. 6.

As shown in FIG. 5, the transmission operation unit 406b, which corresponds to the operation unit OP shown in FIG. 1, is connected to the operation information detection unit 406c as the slave device. The transmission operation unit 406b receives a transmission operation on the crank sprocket 104 by a bicycle rider (hereinafter simply called rider), that is, a shift-up operation or a shift-down operation. For example, to shift up the crank sprocket 104, the rider pushes the transmission operation unit 406b in a predetermined first direction with his/her finger (shift-up operation). To shift down the crank sprocket 104, the rider pushes the transmission operation unit 406b in a second direction different from the above-described first direction with his/her finger (shift-down operation).

As shown in FIG. 5, the operation information detection unit 406c includes a low-pass filter 51, a power-on reset circuit 52, a communication control circuit 53, a connection switch 54, a high-pass filter 55, the operation execution switch SW, the line LC, the operation link mechanism LK, and the resistor R. The low-pass filter 51, the power-on reset circuit 52, the communication control circuit 53, the connection switch 54, and the high-pass filter 55 correspond to the communication processing unit TR1 shown in FIG. 1.

The low-pass filter 51 extracts the power supply voltage VDD being a direct current component from the power transmission line 300, and supplies the power supply voltage VDD to the power-on reset circuit 52, the communication control circuit 53, and the connection switch 54.

In response to the supplying of the power supply voltage VDD, the power-on reset circuit 52 generates a single reset pulse only at the time of starting the supplying, and sends the reset pulse to the communication control circuit 53.

The communication control circuit 53 includes a sensor 531, a controller 532, and a transmitting and receiving unit 533 actuated by the supplying of the power supply voltage VDD. The sensor 531, the controller 532, and the transmitting and receiving unit 533 are initialized in response to the above-described reset pulse that is supplied immediately after the supplying of the power supply voltage VDD, and then perform the following operation.

That is, the sensor 531 detects whether the rider has performed the shift-up operation, the shift-down operation, or no transmission operation on the transmission operation unit 406, and supplies the controller 532 with the operation signal OS that indicates the operation contents.

The controller 532 supplies the transmitting and receiving unit 533 with the operation signal OS supplied from the sensor 531.

The transmitting and receiving unit 533 receives the setting signal CT sent from the control unit 200 through the high-pass filter 55 and the connection switch 54. The transmitting and receiving unit 533 supplies the connection switch 54 with the above-described operation signal OS at the transmission timing corresponding to the operation information detection unit 406c indicated by the setting signal CT, for example, at a time T3 shown in FIG. 6.

The connection switch 54 selects one of the transmitting and receiving unit 533 and the operation execution switch SW based on whether or not the power supply voltage VDD is supplied from the low-pass filter 51, and electrically connects the selected one to the high-pass filter 55.

In other words, while the power supply voltage VDD is supplied from the low-pass filter 51, the connection switch 54 electrically connects the transmitting and receiving unit 533 to the high-pass filter 55. Thus, the connection switch 54 supplies the high-pass filter 55 with the operation signal OS supplied from the transmitting and receiving unit 533. When the power supply voltage VDD is not supplied, the connection switch 54 electrically connects the high-pass filter 55 to one end of the operation execution switch SW through the line LC. To the other end of the operation execution switch SW, the ground potential GND is applied as the reference potential through the resistor R. It is noted that the high-pass filter 55 may be directly connected to the communication control circuit 53 and the line LC, without providing the connection switch 54.

The operation link mechanism LK transmits to the operation execution switch SW, a force applied to the transmission operation unit 406b at a time when the rider performs the shift-up operation or the shift-down operation on the transmission operation unit 406b. Thereby, the operation execution switch SW is switched from the off state to the on state. The operation execution switch SW is, for example, a mechanical micro-switch that is turned on only while the force is applied through the operation link mechanism LK. The operation execution switch SW is turned on only while the user is performing the shift-up operation or the shift-down operation on the transmission operation unit 406b. By turning on the operation execution switch SW, the ground potential GND is applied to the line LC.

The high-pass filter 55 provided between the power transmission line 300 and the connection switch 54 prevents the power supply voltage VDD, which is superimposed on the power transmission line 300, from being supplied to the transmitting and receiving unit 432 of the communication control circuit 43, while passing the operation signal OS, the pilot signal PLS, or the setting signal CT. The high-pass filter 55 is a so-called passive filter requiring no power source.

According to the configuration described above, the operation information detection unit 406c as the slave device is actuated by the power supply voltage VDD supplied through the power transmission line 300, and detects the contents of the operation (i.e., shift-up operation, shift-down operation, or no operation) received by the transmission operation unit 406b. The operation information detection unit 406c sends the operation signal OS that indicates the operation contents to the control unit 200 through the power transmission line 300 at the time T3 shown in FIG. 6.

While the power supply voltage VDD is not supplied, the operation information detection unit 406c is in an operation state detection mode in which the high-pass filter 55 is electrically connected to the operation execution switch SW through the line LC.

In the operation state detection mode, the operation execution switch SW comes to the on state upon reception of the transmission operation (i.e., shift-up operation or shift-down operation) by the transmission operation unit 406b, while the operation execution switch SW comes to the off state if the transmission operation unit 406b receives no transmission operation. Thus, upon reception of the transmission operation by the transmission operation unit 406b, a current path that is composed of the power transmission line 300, the high-pass filter 55, the connection switch 54, the line LC, the operation execution switch SW, and the resistor R becomes a closed state. If the transmission operation unit 406b receives no transmission operation, the current path becomes an open state. Accordingly, in the operation state detection mode, if the above-described transmission operation is received while the control unit 200 is sending the pilot signal PLS to the power transmission line 300, a current accompanying the pilot signal PLS flows through the power transmission line 300 via the current path. However, if no transmission operation is received, the current path becomes the open state, and thus the current accompanying the pilot signal PLS does not flow through the power transmission line 300.

Accordingly, in the operation state detection mode, it is possible to know whether or not the transmission operation unit 406b has received the transmission operation, by determining whether or not the current accompanying the pilot signal PLS has flown through the current detection line LG on the side of the control unit 200.

In FIG. 5, the operation information detection unit 407c as the slave device has a configuration similar to that of the operation information detection unit 406c. That is, the operation information detection unit 407c includes the low-pass filter 51, the power-on reset circuit 52, the communication control circuit 53, the connection switch 54, the high-pass filter 55, the operation execution switch SW, the line LC, the operation link mechanism LK, and the resistor R. However, the transmission operation unit 407b, which receives the transmission operation of the rear wheel sprocket, is connected to the operation information detection unit 407c as the operation information detection unit corresponding to the operation unit OP shown in FIG. 1. For example, to shift up the rear wheel sprocket 106, the rider pushes the transmission operation unit 407b in the first direction with his/her finger (shift-up operation). To shift down the rear wheel sprocket 106, the rider pushes the transmission operation unit 407b in the second direction with his/her finger (shift-down operation). In the operation information detection unit 407c, the transmitting and receiving unit 533 of the communication control circuit 53 receives the setting signal CT sent from the control unit 200. The transmitting and receiving unit 533 supplies the connection switch 54 with the operation signal OS that indicates the operation contents on the transmission operation unit 407b detected by the sensor 531 at the transmission timing corresponding to the operation information detection unit 407c indicated by the setting signal CT, for example, at a time T4 shown in FIG. 6.

Therefore, the operation information detection unit 407c as the slave device is actuated by the power supply voltage VDD supplied through the power transmission line 300, and first detects the contents of the operation (shift-up operation, shift-down operation, or no operation) received by the transmission operation unit 407b. Then, the operation information detection unit 407c sends the operation signal OS that indicates the operation contents to the control unit 200 through the power transmission line 300 at the time T4 shown in FIG. 6. While the power supply voltage VDD is not supplied, the operation information detection unit 407c is in the operation state detection mode, just as with the operation information detection unit 406c.

The operation by the above-described configuration shown in FIGS. 3 to 5 will be hereinafter described with reference to FIG. 6.

First, when the battery 100 starts supplying the power supply voltage VDD, the controller 211 of the control unit 200 supplies the power switch 24 with the power supply stop signal Gn. Since the power switch 24 is kept in the off state in response to the power supply stop signal Gn, the supplying of the power supply voltage VDD into each of the transmission state detection units 403c and 404c and the operation information detection units 406c and 407c is stopped. Thereby, the transmission state detection units 403c and 404c are in an operation stop state. The operation information detection units 406c and 407c are each in the operation state detection mode, as described above.

Furthermore, the controller 211 supplies the connection switch 213 with the connection selection signal SS having a logic level of 0, and also supplies the pilot generation unit 210 with the start pulse STA. Thus, the pilot generation unit 210 generates the pilot signal PLS the signal level of which varies at a high frequency in an intermittent manner as shown in FIG. 6, and sends the pilot signal PLS to the power transmission line 300 through the current detection line LG, the connection switch 213, and the high-pass filter 22.

While the power supply voltage VDD is not supplied, the operation information detection units 406c and 407c are each in the operation state detection mode, as described above. At this time, if neither of the transmission operation units 406b and 407b receives the transmission operation, the operation execution switches SW of both of the operation information detection units 406c and 407c are in the off state. Therefore, the current accompanying the pilot signal PLS sent from the pilot generation unit 210 does not flow through the power transmission line 300. The current detection unit 212 of the control unit 200 supplies the controller 211 with the current detection signal CD indicating that the current accompanying the pilot signal PLS does not flow through the current detection line LG.

When the transmission operation is started on at least one of the operation information detection units 406c and 407c, the operation execution switch SW comes to the on state. Thus, the current accompanying the pilot signal PLS flows through the current detection line LG in the control unit 200, the connection switch 213, the high-pass filter 22, the power transmission line 300, the high-pass filter 55, the line LC, and the operation execution switch SW into the resistor R. The current detection unit 212 of the control unit 200 supplies the controller 211 with the current detection signal CD indicating that the current accompanying the pilot signal PLS is flowing through the current detection line LG, for example, the current detection signal CD having a logic level of 1, as shown in FIG. 6.

In response to the current detection signal CD indicating the current flow, the controller 211 supplies the pilot generation unit 210 with the stop pulse STP, as well as supplies the connection switch 213 with the connection selection signal SS having a logic level of 1. Thus, as shown in FIG. 6, the pilot generation unit 210 stops the generation of the pilot signal PLS. In response to the connection selection signal SS having a logic level of 1, the connection switch 213 connects the transmitting and receiving unit 214 to the high-pass filter 22. Thus, the communication becomes possible between the control unit 200 and each of the transmission state detection units 403c and 404c and the operation information detection units 406c and 407c.

Moreover, in response to the current detection signal CD indicating that the current is flowing, the controller 211 supplies the power switch 24 with the power supply start signal Gs. In response to the power supply start signal Gs, the power switch 24 is kept in the on state, and the supplying of the power supply voltage VDD into each of the transmission state detection units 403c and 404c and the operation information detection units 406c and 407c is started.

The transmitting and receiving unit 214 of the control unit 200 supplies the setting signal CT, which indicates the transmission timing at which the transmission state detection units 403c and 404c and the operation information detection units 406c and 407c each send the operation signal OS or the detection signal DQ, to the high-pass filter 22 through the connection switch 213. The setting signal CT indicates, for example, the time T1 shown in FIG. 6 as the transmission timing of the transmission state detection unit 403c, the time T2 as the transmission timing of the transmission state detection unit 404c, the time T3 as the transmission timing of the operation information detection unit 406c, and the time T4 as the transmission timing of the operation information detection unit 407c.

After the supplying of the power supply voltage VDD is started as described above, the control unit 200 sends the setting signal CT to each of the transmission state detection units 403c and 404c and the operation information detection units 406c and 407c through the power transmission line 300, as shown in FIG. 6.

The transmission state detection units 403c and 404c and the operation information detection units 406c and 407c are each actuated by the power supply voltage VDD supplied from the control unit 200, and initialized separately. Then, the transmission state detection units 403c and 404c and the operation information detection units 406c and 407c each receive the setting signal CT sent from the control unit 200 through the power transmission line 300. Then, each of the transmission state detection units 403c and 404c and the operation information detection units 406c and 407c sends the detection signal DQ or the operation signal OS as described below, at the transmission timing indicated by the setting signal CT.

That is, first, the transmission state detection unit 403c detects the transmission state of the crank sprocket 104, and sends the detection signal DQ that indicates its detection result to the control unit 200 through the power transmission line 300 at the time T1 shown in FIG. 6. Then, the transmission state detection unit 404c detects the transmission state of the rear wheel sprocket 106, and sends the detection signal DQ that indicates its detection result to the control unit 200 through the power transmission line 300 at the time T2 shown in FIG. 6. Then, the operation information detection unit 406c detects the contents of the transmission operation of the crank sprocket 104 received by the transmission operation unit 406b, and sends the operation signal OS that indicates its operation contents to the control unit 200 through the power transmission line 300 at the time T3 shown in FIG. 6. Then, the operation information detection unit 407c detects the contents of the transmission operation of the rear wheel sprocket 106 received by the transmission operation unit 407b, and sends the operation signal OS that indicates its operation contents to the control unit 200 through the power transmission line 300 at the time T4 shown in FIG. 6.

The control unit 200 generates a derailleur drive signal to drive the mechanical part 403a of the front derailleur 403 on the basis of the detection signal DQ supplied from the transmission state detection unit 403c and the operation signal OS supplied from the operation information detection unit 406c. In other words, the control unit 200 generates the derailleur drive signal for shifting the chain 105 in a shift direction indicated by the operation signal OS by a distance based on the detection signal DQ. The control unit 200 supplies the derailleur drive signal to the motor 403b of the front derailleur 403 through the wiring 500. The control unit 200 generates a derailleur drive signal to drive the mechanical part 404a of the rear derailleur 404 on the basis of the detection signal DQ supplied from the transmission state detection unit 404c and the operation signal OS supplied from the operation information detection unit 407c. In other words, the control unit 200 generates the derailleur drive signal for shifting the chain 105 in a shift direction indicated by the operation signal OS by a distance based on the detection signal DQ. The control unit 200 supplies the derailleur drive signal to the motor 404b of the rear derailleur 404 through the wiring 500.

In the above-described series of processing by the control unit 200, the electric transmission processing of the crank sprocket 104 or the rear wheel sprocket 106 is performed in accordance with the transmission operation by the rider.

When the power supply effective time ET has elapsed after the supplying of the power supply voltage VDD to each of the transmission state detection units 403c and 404c and the operation information detection units 406c and 407c is started, as shown in FIG. 6, the controller 211 of the control unit 200 supplies the power switch 24 with the power supply stop signal Gn. In response to the power supply stop signal Gn, the power switch 24 makes transition from the on state to the off state, and the supplying of the power supply voltage VDD to each of the transmission state detection units 403c and 404c and the operation information detection units 406c and 407c is stopped. Thus, the transmission state detection units 403c and 404c become the operation stop state, and the operation information detection units 406c and 407c each go into the above-described operation state detection mode again.

Furthermore, the controller 211 supplies the connection switch 213 with the connection selection signal SS having a logic level of 0, and supplies the pilot generation unit 210 with the start pulse STA. Thus, the pilot generation unit 210 sends again the pilot signal PLS the signal level of which varies at a high frequency in an intermittent manner as shown in FIG. 6 to the power transmission line 300 through the current detection line LG, the connection switch 213, and the high-pass filter 22.

That is, until the transmission operation is performed again by the rider, the supplying of the power supply voltage VDD to the transmission state detection units 403c and 404c and the operation information detection units 406c and 407c is stopped, and the operation information detection units 406c and 407c are in the operation state detection mode to determine whether or not the transmission operation is performed.

Thus, in the electric power supply system applied to the electric transmission shown in FIGS. 3 to 5, while the rider is not performing the transmission operation, that is, during the standby state in which no transmission processing is performed, the supplying of the power to the transmission state detection units 403c and 404c and the operation information detection units 406c and 407c is stopped. Thereby, it is possible to reduce the power consumption during the standby state in which no transmission processing is performed, resulting in reducing the frequency of recharge of the battery 100.

In short, in the above-described electric power supply system, the master device (200) supplies the power supply voltage (VDD) through the power transmission line (300) to the slave device (406c, 407c) that generates the operation signal indicating the contents of the operation received by the operation unit (406b, 407b). The slave device includes the operation execution switch (SW) that becomes in the on state to apply the reference potential (ground potential) to the power transmission line when the operation unit receives the operation. The master device determines whether or not the current is flowing through the power transmission line, while intermittently sending the pilot signal (PLS) to the power transmission line in the state of stopping the supplying of the power supply voltage to the slave device. When the master device determines that the current is flowing, the master device starts supplying the power supply voltage to the slave device. In other words, the operation execution switch becomes the on state when the operation unit receives the operation, while becomes the off state when the operation unit does not receive the operation. Since the master device sends the pilot signal to the power transmission line, the current accompanying the pilot signal flows through the power transmission line while the operation unit is receiving the operation, though the current does not flow through the power transmission line while the operation unit is not receiving the operation. Accordingly, it is possible to determine whether or not the operation unit is receiving the operation by determining whether or not the current is flowing through the power transmission line on the side of the master device, even though no power supply voltage is supplied into the slave device (406c, 407c). The master device determines whether or not the operation unit has received the operation, by determining whether or not the current has flowed through the power transmission line while sending the pilot signal to the power transmission line. Upon reception of the operation by the operation unit, the master device supplies the power supply voltage to the slave device only during the predetermined power supply effective time (ET).

In the above embodiment, no power supply voltage is supplied to the transmission state detection units 403c and 404c and the operation information detection units 406c and 407c from the time of stopping the power supply to the transmission state detection units 403c and 404c and the operation information detection units 406c and 407c until the time when the rider performs the transmission operation.

However, if no transmission operation is performed after a lapse of predetermined waiting time after stopping the supplying of the power, the transmission state detection units 403c and 404c and the operation information detection units 406c and 407c may be forcedly supplied with power supply voltage VDD. For example, the slave device having a sensor has to be always supplied with the power supply voltage and the sensor is intermittently operated, in order to steadily grasp its conditions using the sensor. However, the configuration according to the embodiment allows the intermittent operation of the sensor, while controlling the supplying the power supply voltage on the master side, and contributes to a greater power saving.

Figure 7:
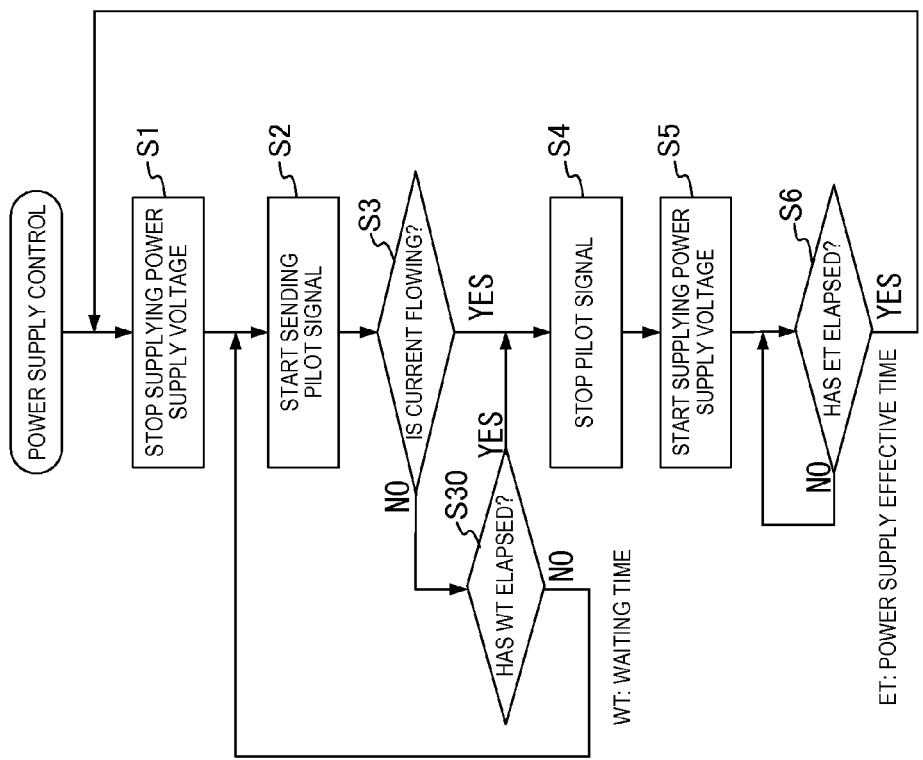
FIG. 7 is a flowchart of a modification example of the power supply control flow.

FIG. 7 is the drawing showing a modification example of the power supply control flow taking such terms into consideration. Note that, the power supply control flow shown in FIG. 7 includes the same steps S1 to S6 as the power supply control flow shown in FIG. 2, and the controller 211 of the control unit 200 performs the steps S1 to S6, just as with the master device 2 described above. In the step S3, if it is determined that the current accompanying the pilot signal PLS is not flowing in the step S3, the controller 211 determines whether or not a predetermined waiting time WT has elapsed after the supplying of the power is stopped in the step S1 (step S30). If it is determined in the step S30 that the waiting time WT has not elapsed yet, the controller 211 goes to the step S2. If it is determined in the step S30 that the waiting time WT has already elapsed, or it is determined in the step S3 that the current accompanying the pilot signal PLS is flowing, the controller 211 sequentially performs the steps S4 and S5. Thus, the supplying of the power supply voltage VDD to the transmission state detection units 403c and 404c and the operation information detection units 406c and 407c is started.

In the above embodiment, the power supply voltage VDD is simultaneously applied to each of the transmission state detection units 403c and 404c and the operation information detection units 406c and 407c through the common power transmission line 300.

However, the power supply voltage VDD may be supplied to each of the transmission state detection units 403c and 404c and the operation information detection units 406c and 407c through separate power transmission lines. At this time, the control unit 200 may supply the power supply voltage VDD only to one of the operation information detection units 406c and 407c to which the transmission operation unit (406b or 407b) that has actually received the operation is connected, and the transmission state detection unit (403c or 404c) corresponding to this transmission operation unit. Moreover, in this configuration, the power supply voltage VDD may be forcedly supplied to one of the transmission state detection units 403c and 404c in which the waiting time WT has elapsed after stopping the supplying of the power supply voltage VDD, immediately after the lapse of the waiting time WT.

In the power supply control shown in FIG. 7, if the transmission operation is not performed during the predetermined waiting time after the supplying of the power is stopped, the power supply voltage VDD is forcedly supplied into the transmission state detection units 403c and 404c and the operation information detection units 406c and 407c. At this time, the delivery period of the pilot signal may be set long.

Figure 8:
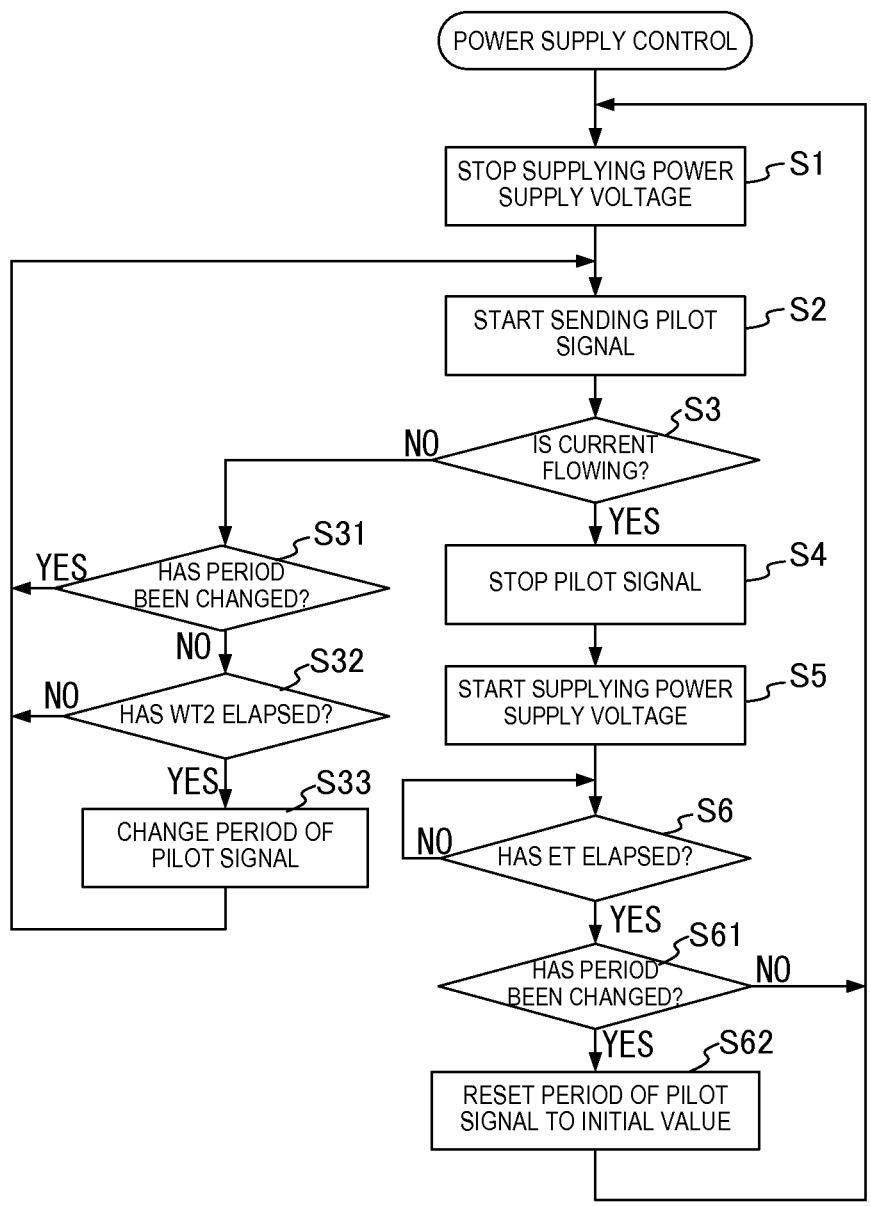
FIG. 8 is a flowchart showing another example of the power supply control flow.
Figure 9:
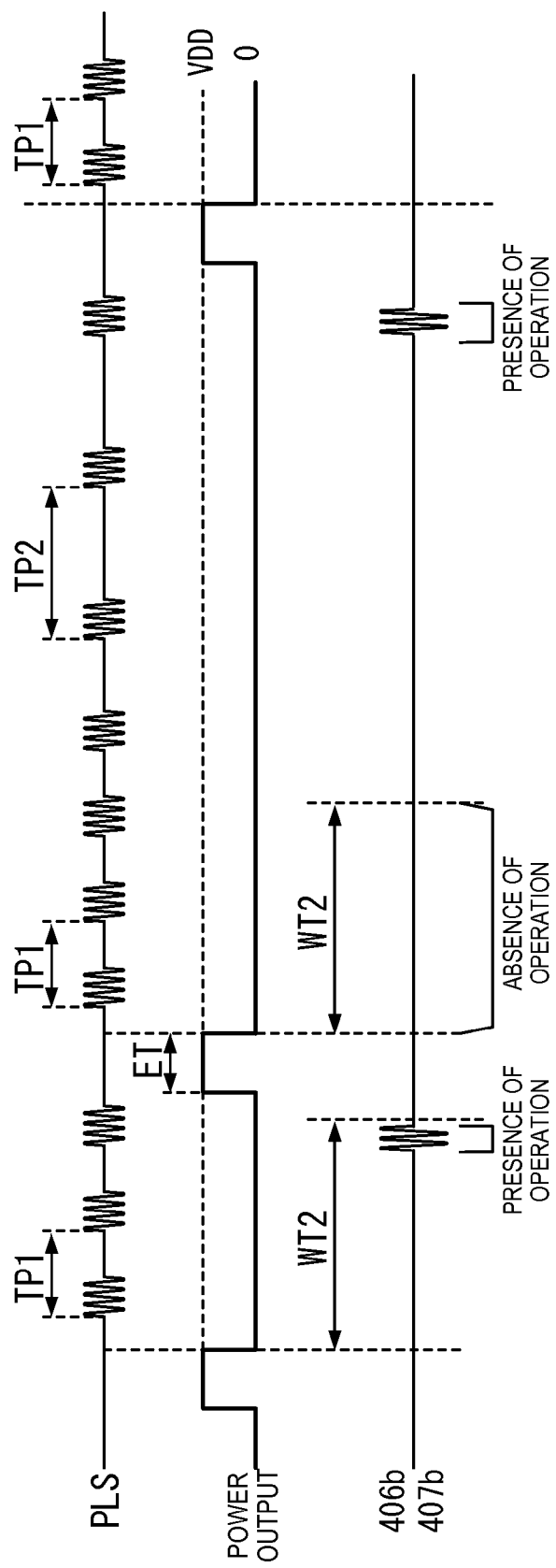
FIG. 9 is a time chart showing an example of the operation performed by the power supply control shown in FIG. 8.

FIG. 8 is the drawing showing another example of the power supply control flow that the controller 211 of the control unit 200 performs. The operation in the steps S1 to S6 shown in FIG. 8 is the same as that in FIG. 7. However, if it is determined in the step S3 that the current accompanying the pilot signal PLS is not flowing, the controller 211 performs the following steps S31 to S33. More specifically, if it is determined in the step S3 that the current accompanying the pilot signal PLS is not flowing, the controller 211 determines whether or not the period of the pilot signal PLS has been changed (step S31). If it is determined in the step S31 that the period has not been changed, the controller 211 determines whether or not a predetermined waiting time WT2 has elapsed after the stop of the power supply (step S32). If it is determined in the step S32 that the waiting time WT2 has elapsed, the controller 211 supplies the pilot generation unit 210 with a control command to change a delivery period TP1 of the pilot signal PLS shown in FIG. 9 to a delivery period TP2 longer than the delivery period TP1 (step S33). By performing the step S33, as shown in FIG. 9, the pilot generation unit 210 sends the pilot signal PLS the delivery period of which is changed from TP1 to TP2 to the power transmission line 300.

After performing the step S33, or if it is determined in the step S32 that the waiting time WT2 has not lapsed yet, or if it is determined in the step S31 that the delivery period has already been changed, the operation goes back to the step S2 and the controller 211 repeats the operation described above.

Furthermore, according to the power supply control flow shown in FIG. 8, if it is determined in the step S6 that the power supply effective time ET has elapsed, the controller 211 determines whether or not the delivery period of the pilot signal PLS has been changed (step S61). If it is determined in the step S61 that the delivery period of the pilot signal PLS has been changed, the controller 211 supplies the pilot generation unit 210 with a control command to reset the delivery period TP2 of the pilot signal PLS to an initial period, that is, the delivery period TP1 (step S62). By performing the step S62, the pilot generation unit 210 intermittently sends the pilot signal PLS at the initial delivery period TP1 to the power transmission line 300.

After performing the step S62 or if it is determined in the step S61 that the delivery period of the pilot signal PLS has not been changed, the operation goes back to the step S1 and the controller 211 repeats the operation described above.

The operation according to the power supply control shown in FIG. 8 will next be described with reference to FIG. 9.

First, as shown in FIG. 9, the control unit 200 intermittently sends the pilot signal PLS at the delivery period TP1

(step S2), to determine whether or not the operation is performed by the transmission operation unit 406*b* or 407*b* (step S3). When the operation is performed by the transmission operation unit 406*b* or 407*b* during the waiting time WT2 after the supplying of the power supply voltage VDD is stopped, the control unit 200 starts supplying the power supply voltage VDD. When the operation is not performed by the transmission operation unit 406*b* or 407*b* during the waiting time WT2, the control unit 200 sends the pilot signal PLS the delivery period of which is changed into TP2 longer than TP1, as shown in FIG. 9 (steps S33, S2). While doing so, if the operation is performed by the transmission operation unit 406*b* or 407*b*, the control unit 200 starts supplying the power supply voltage VDD as shown in FIG. 9, and then resets the delivery period of the pilot signal PLS from TP2 to TP1 (step S62).

According to the power supply control shown in FIGS. 8 and 9, if it is determined that the operation is not performed by the transmission operation unit 406*b* or 407*b* during the waiting time WT2 after the supplying of the power supply voltage VDD is stopped, the delivery period of the pilot signal PLS is elongated. This contributes to greater power saving.

In the power supply control shown in FIGS. 8 and 9, the delivery period of the pilot signal PLS is changed on the basis of the time interval of the operation by the transmission operation unit (406*b*, 407*b*). However, the delivery period of the pilot signal PLS may be changed on the basis of the detection signal DQ sent from the transmission state detection unit (403*c*, 404*c*) or the operation signal OS sent from the operation information detection unit (406*c*, 407*c*).

Figure 10:
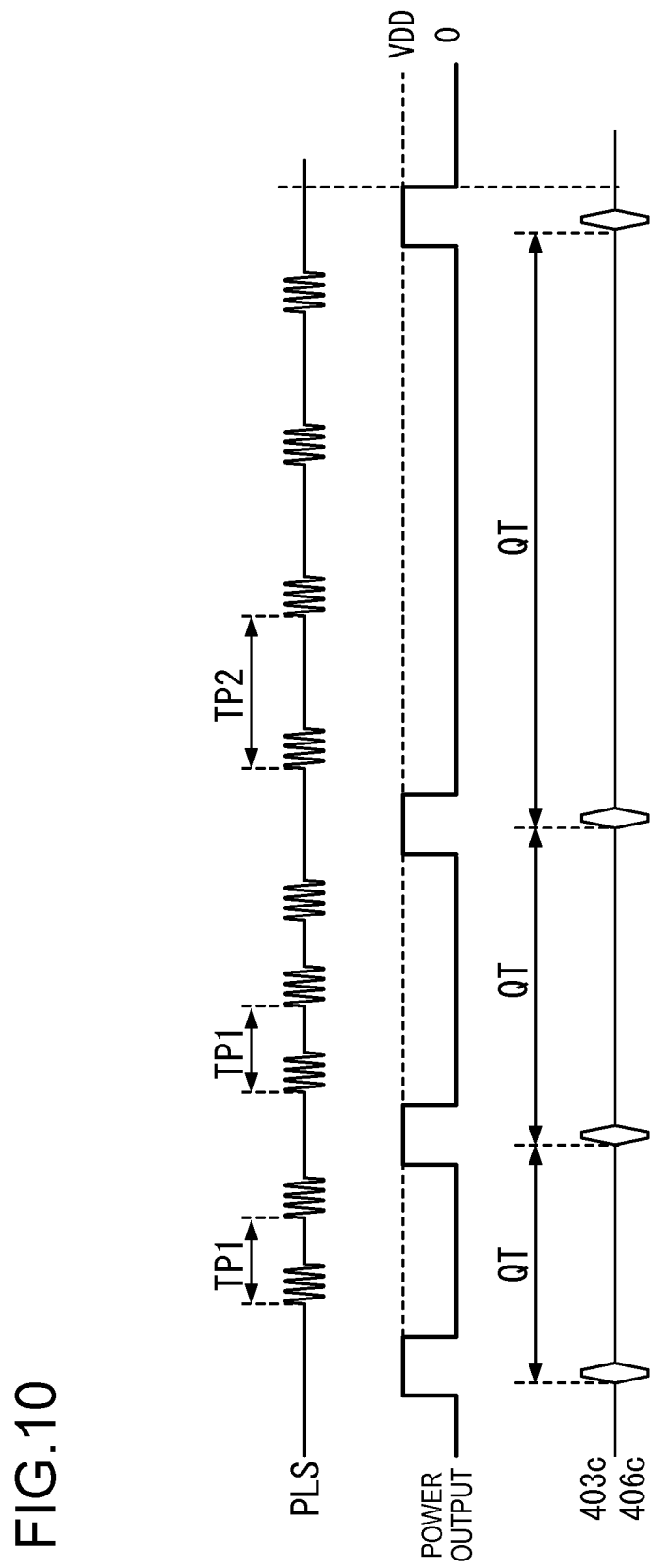
FIG. 10 is a time chart showing another example of the power supply operation.

For example, as shown in FIG. 10, whether or not the delivery period QT of the detection signal DQ or the operation signal OS is smaller than a predetermined reference period is determined. If the delivery period QT is determined to be smaller, the control unit 200 sends the pilot signal PLS having the delivery period TP1. If the delivery period QT of the detection signal DQ or the operation signal OS is determined to be longer than the predetermined reference period, the delivery period of the pilot signal PLS after that is changed from TP1 to the TP2, which is longer than TP1, as shown in FIG. 10.

Further, in the system shown in FIGS. 4 and 5, the control unit 200 as the master device directly supplies the power to the motors 403*b* and 404*b* and directly controls the motors 403*b* and 404*b*, but the slave device may perform the supplying and the control instead. This configuration allows power saving owing to the control of the supplying of the power supply voltage to the motors and efficient power consumption owing to appropriate supplying of the power supply voltage.

Figure 11:
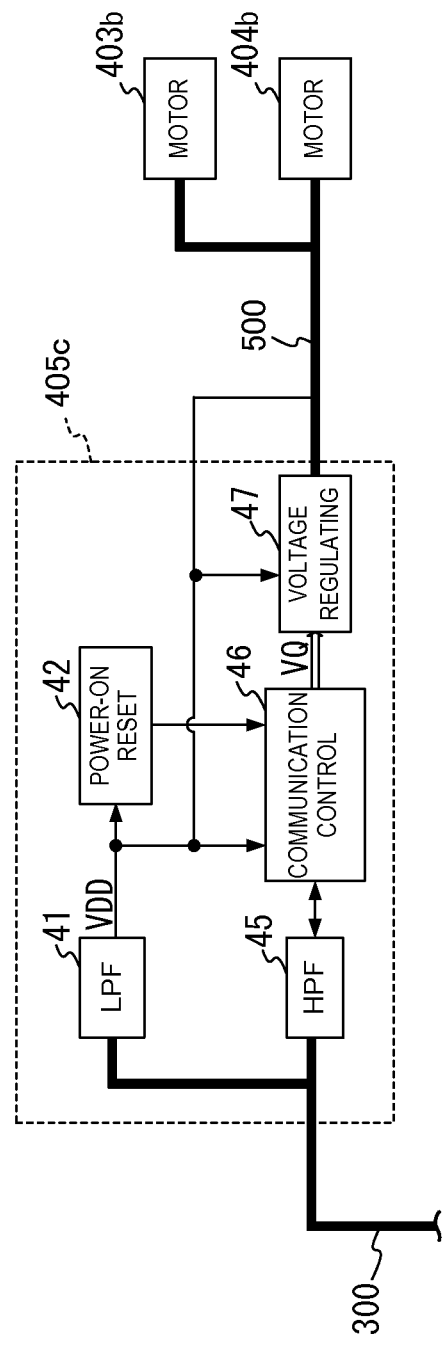
FIG. 11 is a block diagram showing the configuration of a motor driving unit 405c.
Figure 12:
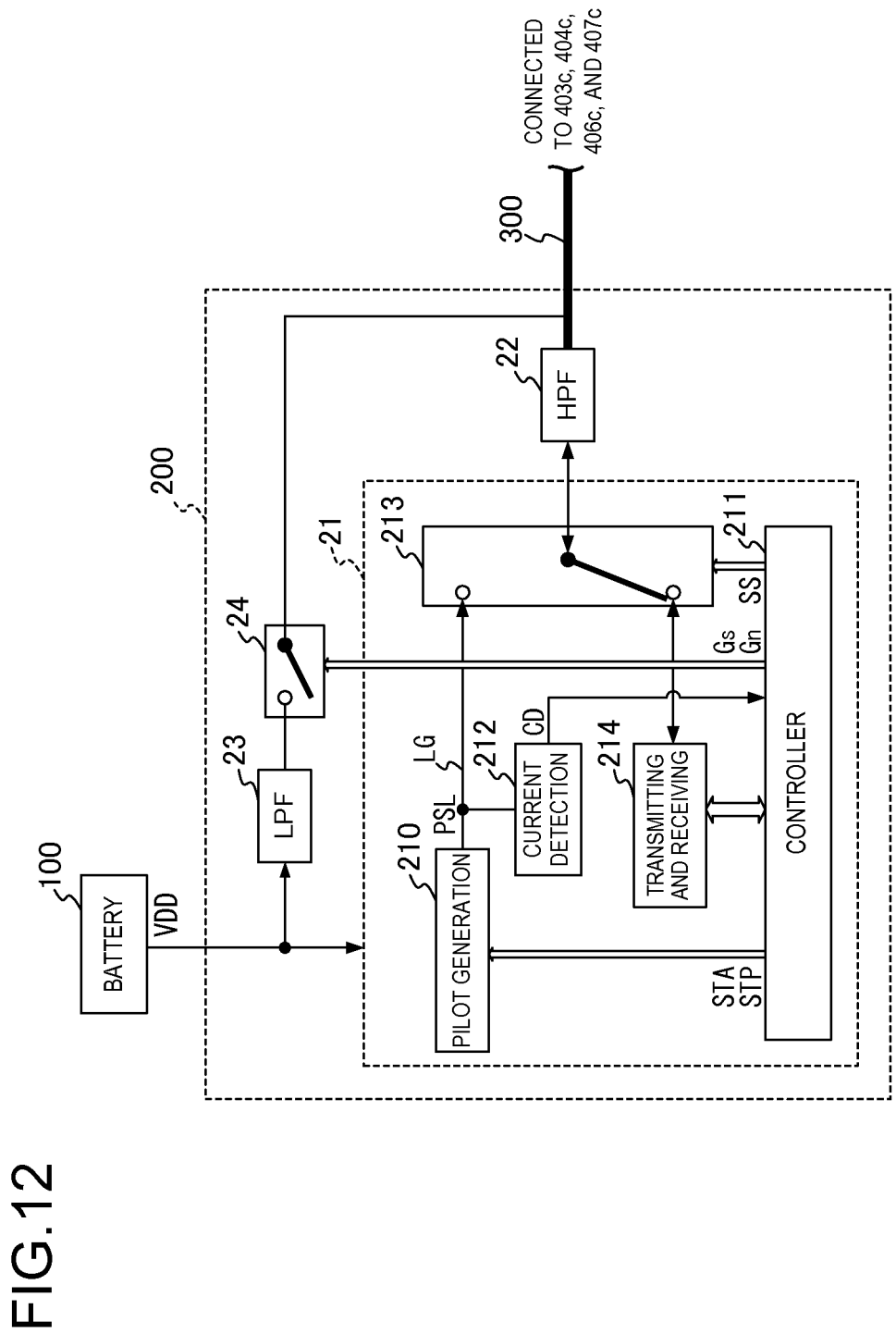
FIG. 12 is a block diagram showing the connection state of the control unit 200 in the case of using the motor driving unit 405c.

For example, as shown in FIG. 11, a motor driving unit 405*c* as a slave device that directly supplies the power supply voltage to the motors 403*b* and 404*b* and directly controls the driving of the motors 403*b* and 404*b* is connected to the power transmission line 300, together with the transmission state detection units 403*c* and 404*c* and the operation information detection units 406*c* and 407*c*. In this case, as shown in FIG. 12, the control unit 200 connected to the power transmission line 300 is not connected directly to the motors 403*b* and 404*b*.

Just as with the transmission state detection unit 403*c*, the motor driving unit 405*c* shown in FIG. 11 has the low-pass filter 41, the power-on reset circuit 42, and the high-pass filter 45. However, the motor driving unit 405*c* uses a communication control circuit 46 instead of the communication control circuit 43 at the transmission state detection unit 403*c*, and a voltage regulating unit 47 instead of the sensor 44 therein.

At this time, the communication control circuit 46 receives derailleur drive data VQ supplied from the control unit 200 through the power transmission line 300, and sends the derailleur drive data VQ to the voltage regulating unit 47. The voltage regulating unit 47 converts the derailleur drive data VQ into an analog derailleur drive signal, and supplies the derailleur drive signal to the motors 403*b* and 404*b* through the wiring 500. Note that, the motor driving unit 405*c* supplies the power supply voltage VDD obtained through the low-pass filter 41 to the motors 403*b* and 404*b* through the wiring 500.

This application is based on a Japanese Patent Application No. 2014-166156 which is hereby incorporated by reference.

What is claimed is:

1. An electric power supply system comprising:
 a battery for generating a power supply voltage;
 an operation unit for receiving an operation by a user;
 a slave device for generating an operation signal that indicates contents of the operation received by the operation unit; and
 a master device connected to the battery, the master device configured to controls the supplying of the power supply voltage to the slave device through a power transmission line, wherein
 the slave device has an operation execution switch that is turned on when the operation unit receives the operation, to apply a reference potential to the power transmission line, and
 the master device determines whether or not a current is flowing through the power transmission line, while intermittently sending a pilot signal to the power transmission line in the state of stopping the supplying of the power supply voltage to the slave device, and
 the master device starts supplying the power supply voltage to the slave device if it is determined that the current is flowing.

2. The electric power supply system according to claim 1, wherein the master device stops the supplying of the power supply voltage to the slave device, when a predetermined power supply effective time has elapsed from the start of the supplying of the power supply voltage to the slave device.

3. The electric power supply system according to claim 1, wherein if it is determined that no current flows until a predetermined waiting time has elapsed from stopping the supplying of the power supply voltage, the master device starts the supplying of the power supply voltage to the slave device.

4. The electric power supply system according to claim 1, wherein the operation execution switch is a mechanical switch that is turned on by a force accompanying the operation received by the operation unit.

5. The electric power supply system according to claim 1, wherein the slave device includes a communication processing unit that generates the operation signal indicating the contents of the operation received by the operation unit in response to the supplying of the power supply voltage, and sends the operation signal to the master device through the power transmission line.

6. The electric power supply system according to claim 5, wherein the slave device includes a power-on reset circuit that initializes the communication processing unit at a time when the supplying of the power supply voltage is started.

7. The electric power supply system according to claim 1, wherein if it is determined that no current flows until a predetermined waiting time has elapsed from stopping the supplying of the power supply voltage, the master device elongates a delivery period of the pilot signal.

8. The electric power supply system according to claim 5, wherein the master device elongates a delivery period of the pilot signal, if a delivery period of the operation signal by the slave device is longer than a predetermined reference period.

9. An electric power supply system comprising:
a battery for generating a power supply voltage;
an operation unit for receiving an operation by a user;
a first slave device for generating an operation signal that indicates contents of the operation received by the operation unit;
a second slave device for generating a detection signal that indicates detection contents detected by a sensor; and
a master device connected to the battery, the master device supplying the power supply voltage to the first and second slave devices through a power transmission line, wherein
the first slave device has an operation execution switch that is turned on when the operation unit receives the operation, to apply a reference potential to the power transmission line,
the master device determines whether or not a current is flowing through the power transmission line, while intermittently sending a pilot signal to the power transmission line in a state of stopping the supplying of the power supply voltage to the first and second slave devices, and
the master device starts supplying the power supply voltage to the first and second slave devices if it is determined that the current is flowing.

10. The electric power supply system according to claim 9, wherein the master device stops the supplying of the power supply voltage to the first and second slave devices, when a predetermined power supply effective time has elapsed from the start of the supplying of the power supply voltage to the first and second slave devices.

11. The electric power supply system according to claim 9, wherein if it is determined that no current flows until a predetermined waiting time has elapsed from stopping the supplying of the power supply voltage, the master device starts the supplying of the power supply voltage to the second slave device.

12. The electric power supply system according to claim 9, wherein the operation execution switch is a mechanical switch that is turned on by a force accompanying the operation received by the operation unit.

13. The electric power supply system according to claim 9, wherein
immediately after the supplying of the power supply voltage to the first and second slave devices is started, the master device sends setting signals to the first and second slave devices through the power transmission line, the setting signals indicating first and second transmission timings that correspond to the first and second slave devices, respectively, and are different from each other;
the first slave device generates the operation signal indicating the contents of the operation received by the operation unit in response to the supplying of the power supply voltage, and sends the operation signal to the master device through the power transmission line at the first transmission timing indicated by the setting signal; and
the second slave device generates the detection signal indicating the detection contents detected by the sensor in response to the supplying of the power supply voltage, and sends the detection signal to the master device through the power transmission line at the second transmission timing indicated by the setting signal.

14. The electric power supply system according to claim 9, wherein if it is determined that no current flows until a predetermined waiting time has elapsed from stopping the supplying of the power supply voltage, the master device elongates a delivery period of the pilot signal.

15. The electric power supply system according to claim 13, wherein the master device elongates a delivery period of the pilot signal, if a delivery period of the operation signal by the first slave device or a delivery period of the detection signal by the second slave device is longer than a predetermined reference period.

16. The electric power supply system according to claim 9, further comprising a third slave device connected to the power transmission line, for taking in the power supply voltage sent from the master device to the power transmission line, and supplying a load with the power supply voltage through wiring different from the power transmission line.

* * * * *